United States Patent [19]

Toops

[11] Patent Number: 5,172,043
[45] Date of Patent: Dec. 15, 1992

[54] ENERGY USING DEVICE

[75] Inventor: Kenneth E. Toops, Gainesville, Fla.

[73] Assignee: Gates Energy Products, Inc., Gainesville, Fla.

[21] Appl. No.: 679,718

[22] Filed: Apr. 3, 1991

[51] Int. Cl.⁵ .......................... H02J 7/00; H01M 10/46
[52] U.S. Cl. ............................................ 320/2; 429/7
[58] Field of Search .................... 320/2, 3, 4, 6, 15, 320/22, 23, 24; 429/7, 96, 97, 98, 99, 100, 157

[56] References Cited

U.S. PATENT DOCUMENTS

| | | | |
|---|---|---|---|
| 3,070,748 | 12/1962 | Worobey et al. | |
| 3,579,075 | 5/1971 | Floyd | 320/2 |
| 3,930,889 | 1/1976 | Ruggiero et al. | 429/97 |
| 4,101,818 | 7/1978 | Kelly, III et al. | 320/2 |
| 4,489,268 | 12/1984 | Beachy | 320/2 |
| 4,577,145 | 3/1986 | Mullersman | 429/7 X |
| 4,628,242 | 12/1986 | Scholefield | 320/2 |
| 4,645,996 | 2/1987 | Toops | 320/2 |
| 4,766,361 | 8/1988 | Pusateri | 320/2 |
| 4,816,735 | 3/1989 | Cook et al. | 320/2 |
| 4,963,812 | 10/1990 | Mischenko et al. | 320/2 |

Primary Examiner—Steven L. Stephan
Assistant Examiner—Kristine Peckman
Attorney, Agent, or Firm—C. H. Castleman, Jr.; J. L. Isaac; S. G. Austin

[57] ABSTRACT

A battery powered energy-using device is disclosed which operably distinguishes between batteries having standard and non-standard terminal configurations. The battery compartment in the device is provided with a terminal having first and second insulated contacts, one contact configured to make contact with a battery of standard terminal configuration and the second contact adapted to make contact with a second terminal. In one embodiment the device is associated with charging circuitry which is adapted to recharge a rechargeable battery having the special non-standard terminal configuration, while permitting discharge but not recharge of a primary battery having a standard terminal configuration.

12 Claims, 6 Drawing Sheets

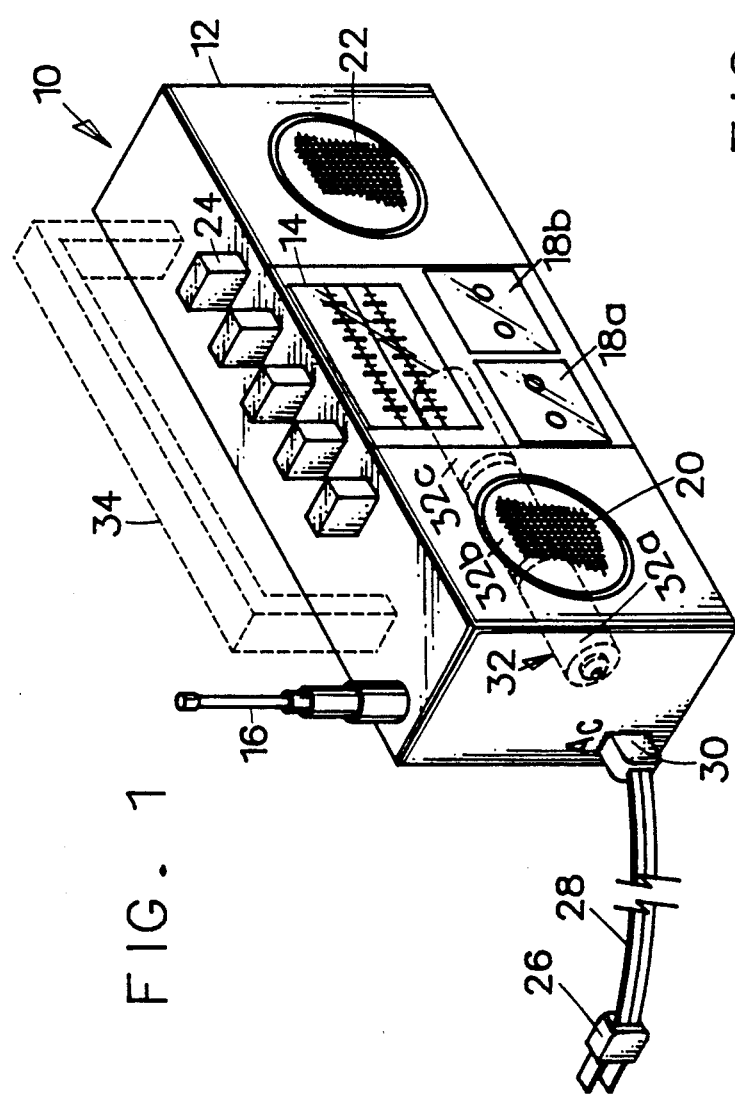
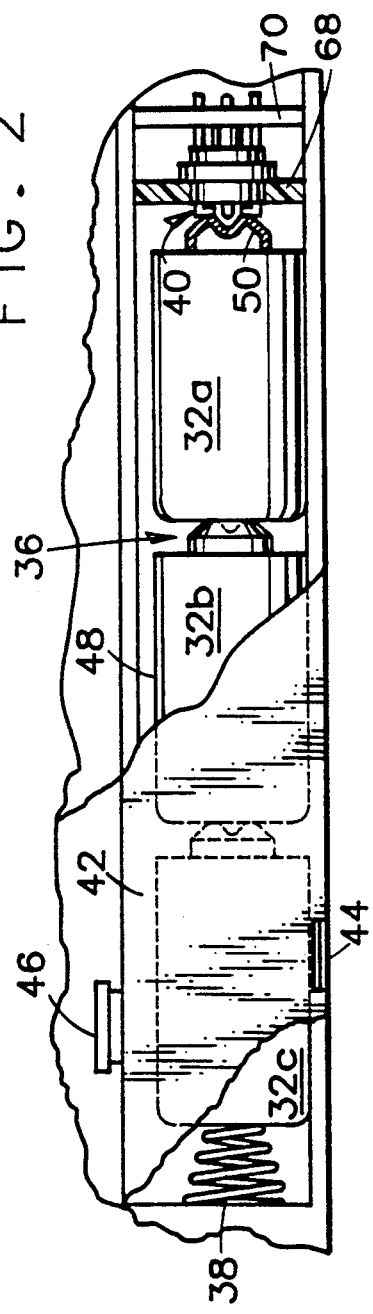
FIG. 1
FIG. 2

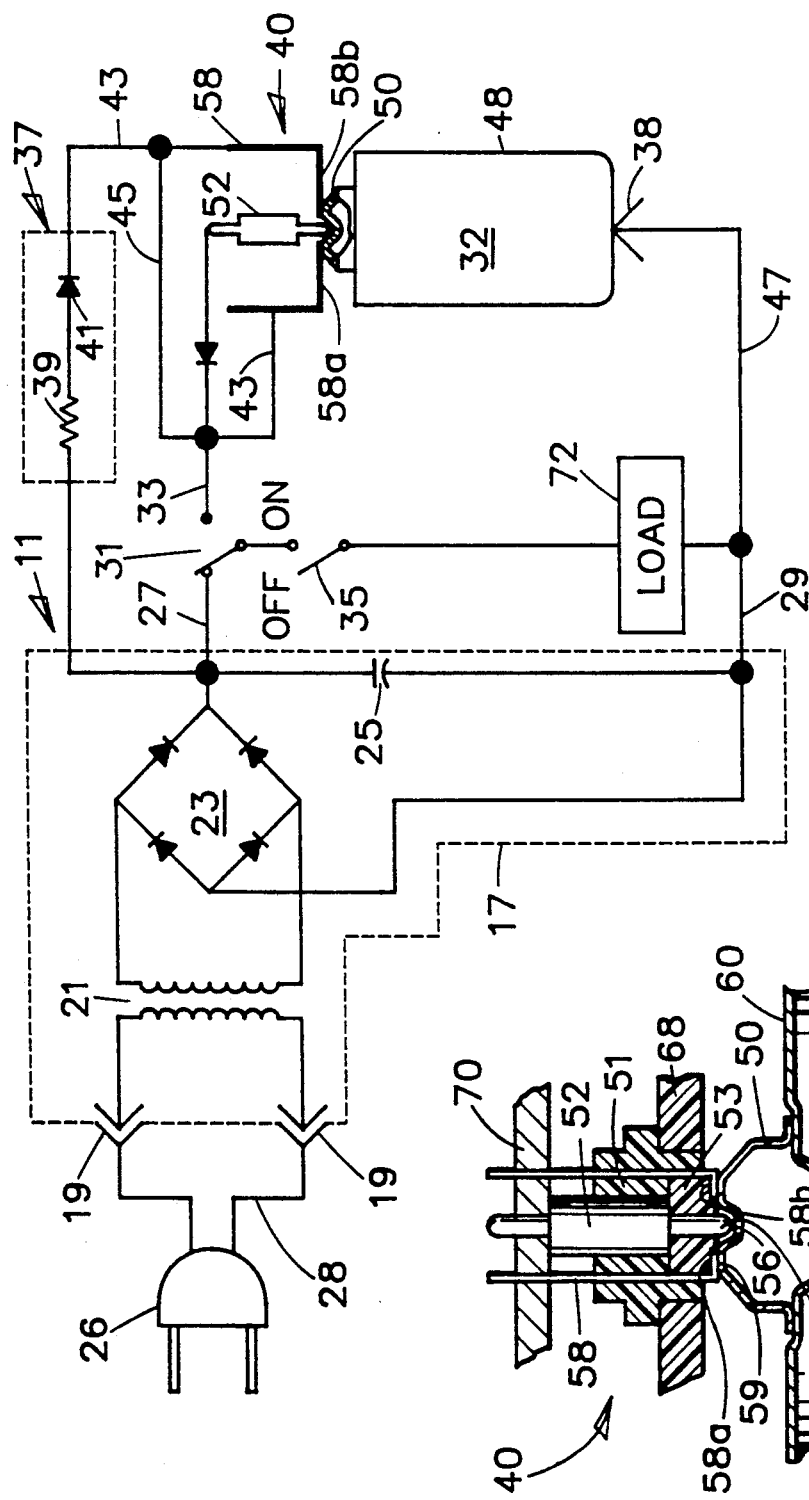

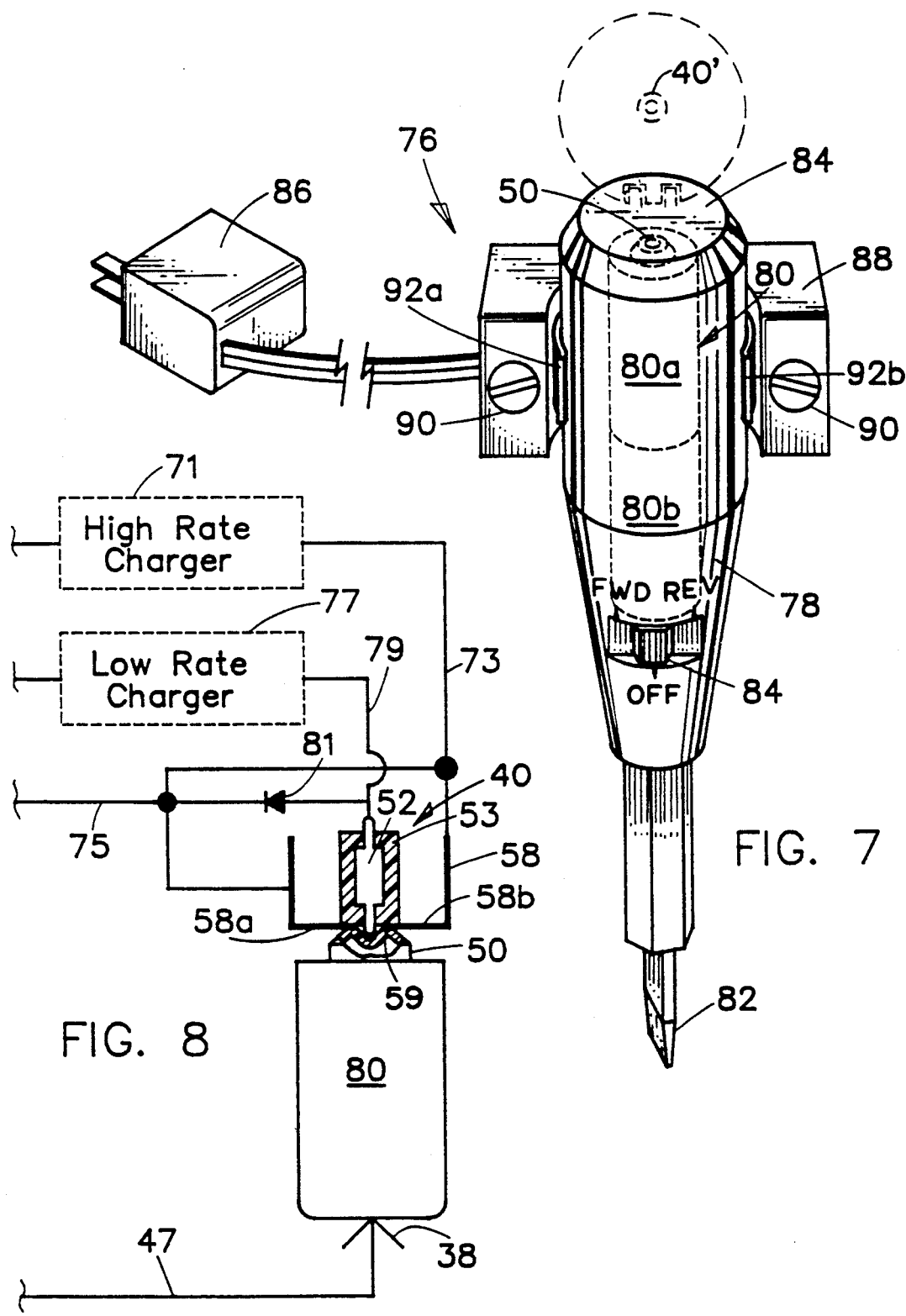

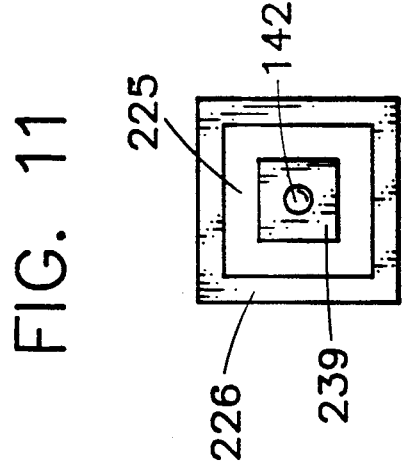
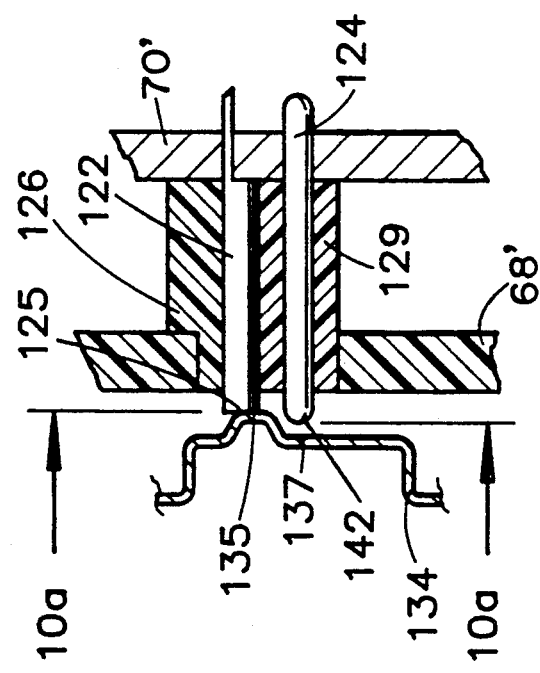
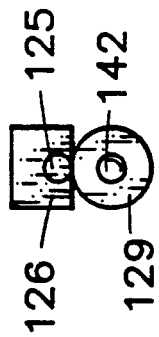

ENERGY USING DEVICE

CROSS REFERENCE TO RELATED APPLICATION

This invention relates to, and may utilize components of, the battery terminal configuration and charging device disclosed in commonly assigned patent application Ser. No. 07/589,156, filed Sep. 27, 1990, entitled "Rechargeable Cell Terminal Configuration and Charging Device."

BACKGROUND OF THE INVENTION

This invention relates to battery powered energy-using devices which operably distinguish between different types of battery power sources, and in particular pertains to safe means for charging rechargeable batteries built in to the energy-using device, while, in one aspect, also allowing the device to be powered by non-rechargeable (primary) batteries yet precluding recharging of the same.

Governmental legislation has recently come into force or is imminent in various European countries, as well as in certain states in the United States of America requiring that battery powered energy-using devices be constructed to provide easy access to the battery compartment. In this manner the batteries may be readily removed from the energy-using devices thereby allowing recycling of the device (minus the battery), as well as permitting collection of the batteries and possible reclaiming of the components thereof. Otherwise, the batteries, some of which contain toxic materials such as mercury or cadmium, may be deposited in landfills with the potential of creating an environmental hazard. An outgrowth of this legislation, whereby the battery compartment will now be easily accessible to the user of the device, and recognizing the growing tendency to utilize longer lasting rechargeable batteries in place of non-rechargeable primaries, is the risk that a battery may be installed or replaced in the device which is not compatible with its power system. For instance, a user may inadvertently replace a rechargeable battery with a primary battery in an AC/DC device such as a portable radio cassette tape player, resulting in recharging of the primary battery when the power cord is inserted into the AC outlet. This situation will likely lead to rupture or explosion of the battery, presenting a health hazard, or leakage of electrolyte which may ruin the energy-using device.

One attempt to overcome the foregoing problem involved the use of a special terminal extension carried by one of the power terminal contacts of the rechargeable battery, so that only the rechargeable battery could be charged in the circuit contained within the energy-using device (see U.S. Pat. No. 4,645,996 to Toops). A battery of non-standard size, of increased cost, had to be used.

In a related approach, certain manufacturers of portable radio cassette tape players and televisions have enclosed coupons with their devices which provides the purchaser with the option of sending away for a specially designed rechargeable battery pack to substitute for the plurality of primary batteries which normally come with the appliance. This special battery pack, examples of which are disclosed more fully in U.S. Pat. No. 4,489,286 to Beachy and U.S. Pat. No. 4,628,242 to Scholefield, employs an extended battery housing provided with an annular side charging ring adapted to mate with a custom charging terminal built in to the energy-using device. The design and placement of the charging terminal, and associated charging circuitry contained within the energy-using device, prevents the recharging of the primary battery installed in the compartment, while allowing recharging of the special rechargeable battery pack.

Not only is there a need for the energy-using device to be configured to distinguish between primary and rechargeable batteries, but also to discriminate between rechargeables which, because of their internal construction, may be designed for different rates of charge and/or discharge. For instance, some rechargeable nickel-cadmium batteries are designed for overnight charging (C/10 rate), others are capable of "quick" charge (three hour rate), and others are so-called "fast" charge capable (C rate, equivalent to a one hour rate). If a slow or quick charge type nickel-cadmium cell is installed in an energy-using device with built-in one-hour rate charging circuitry, the battery may be damaged by charging at a higher rate than it is capable of withstanding.

One object of this invention in one aspect thereof is to provide an energy-using device with built-in or associated charging circuitry, having the versatility to be powered by standard size batteries, both of the primary and rechargeable type, while recharging only rechargeable batteries which are compatible with the device (non-compatible rechargeable batteries may be recharged in an external, compatible charging device).

It is a further object in another aspect of the invention to provide an energy-using device with the versatility to be powered only by compatible rechargeable batteries designed for the energy-using device system, in respect to both discharge and charge of the batteries.

It is still a further object in another aspect to provide such an energy-using device having the characteristic of discriminating between rechargeable cells of differing rate capabilities, and enabling safe recharge of the batteries according to their particular rate capability.

SUMMARY OF THE INVENTION

In one aspect the invention is directed to an energy-using device which operably distinguishes between different types of battery power sources having standard and non-standard terminal configurations. The batteries having either standard or non-standard terminal configurations nevertheless desirably conform to standard industry length dimensions. The device includes a housing, a load associated therewith, and a compartment in the housing adapted to receive a battery for powering the load. The compartment has a first terminal adapted to make electrical contact with one terminal of the battery and second terminal adapted to make electrical contact with the other terminal of the battery. The improvement lies in the configuration of the second terminal of the compartment which includes first and second contacts spaced apart and insulated from one another, at least one of these contacts being electrically conductive. The first contact is arranged and adapted to make contact with a battery of standard terminal configuration, whether of a non-rechargeable or rechargeable type, and the second contact is electrically conductive and arranged and adapted to make electrical contact with a battery having an appropriate non-standard terminal configuration.

In another aspect of the invention, the energy-using device is adapted to be alternative powered by either (i)

a battery of standard terminal configuration, whether of the rechargeable or non-rechargeable type, or (ii) a rechargeable battery having a non-standard terminal configuration, and operable in a battery charging mode in association with a power source and charging circuitry, with the battery mounted in the device, to recharge the rechargeable battery having the non-standard terminal configuration while recharging neither the nonrechargeable nor the rechargeable battery having the standard terminal configuration. The device includes a housing and a load associated therewith; a battery compartment in the housing adapted to received a battery for powering the load; a first electrically conductive terminal positioned in one portion of the compartment arranged to make contact with one terminal of the battery; and a second electrically conductive terminal positioned in a second portion of the compartment arranged to make contact with the other terminal of the battery, the second terminal including a first conductive contact arranged and adapted to make contact with the other terminal of a standard terminal configured battery, and a second conductive contact spaced and insulated from the first conductive contact arranged and adapted to make contact with the other terminal of a non-standard terminal configured battery.

The invention is also directed to the foregoing device in combination with the battery and/or charging circuitry built in to the device (or coupled electrically to the device, such as through a wall-mounted charging stand).

BRIEF DESCRIPTION OF THE DRAWINGS

The invention in its preferred embodiments will be more particularly described by reference to the accompanying drawings, in which like numerals designate like parts.

FIG. 1 is a perspective, partially schematic view of a representative energy-using device constructed in accordance with the invention.

FIG. 2 is a partial cutaway, partial sectional view of the battery compartment of the energy-using device of FIG. 1, illustrating the interface between the battery power source and electrical terminals of the battery compartment.

FIG. 3 is an enlarged, partial sectional view showing more detail of the interface between the device terminal and, the battery terminal of FIG. 2.

FIG. 4 is a schematic diagram of a representative circuit employed in the device of FIG. 1.

FIG. 7 illustrates another type of energy-using device employing the combination of the invention.

FIG. 8 is a schematic diagram similar to FIGS. 5 and 6 illustrating a portion of the circuitry for a device whose associated charging circuitry selectively permits either high-rate or low-rate recharging of the battery installed in an energy-using device.

FIG. 10 is an enlarged, partial sectional view similar to FIG. 3, illustrating an alternative battery and battery compartment terminal configuration and interface.

FIG. 10a is an end view taken along 10a–10a of FIG. 10 illustrating details of the FIG. 10 embodiment.

FIG. 11 is an end view similar to FIG. 10a, illustrating an alternative terminal configuration for the battery compartment of the energy-using device of the invention.

DESCRIPTION OF THE PREFERRED EMBODIMENTS

Figure 6:
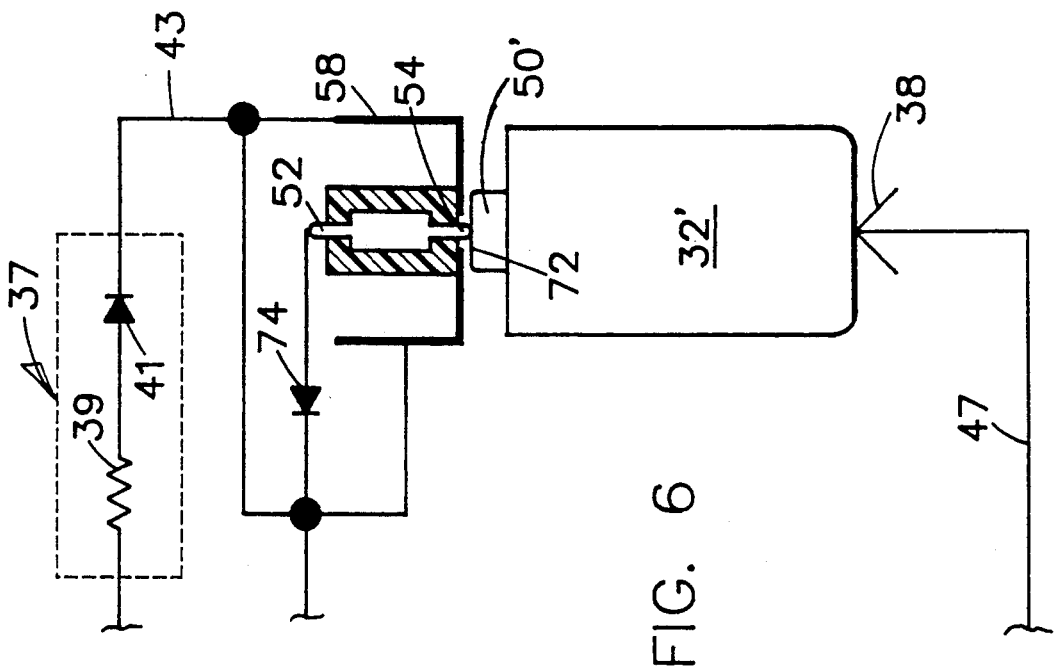
FIGS. 5 and 6 respectively illustrate schematically the use of batteries having appropriate nonstandard terminals, and standard terminals, in the circuitry of FIG. 4.

The term "battery" is used herein in its broadest sense to embrace not only single electrochemical cells, but also multiple electrochemical cells connected together in desired series or parallel connection, monobloc batteries, as well as multiple interconnected electrochemical cells housed in a separate battery pack container, among other configurations.

In FIG. 1 the energy-using device 10 is an AC/DC portable radio cassette tape player. The device includes a housing 12 and such electrical loads as an AM/FM radio, the dial of which is shown at 14, an antenna 16 for receiving radio signals, cassette tape players 18a, 18b and stereo speakers 20, 22 for providing an audio output. Obviously other loads, such as a compact disc player, can be included. The normal controls are shown at 24, which include an on/off switch. For AC operation, standard plug 26, power cord 28 and plug/AC jack 30 are provided for supplying standard 120 VAC line current from a standard outlet.

Alternatively, energy-using device 10 may be used in its DC operational mode, deriving its power from battery pack 32. For DC operation the AC adapter 26, 28, 30 is disengaged from the radio cassette player, and handle 34 slidably raised or pivoted to the gripping position shown, to permit carrying of the portable device to a desired remote location The AC and DC modes of operation will be discussed more fully in conjunction with the description of FIG. 4.

Various primary batteries e.g. carbon-zinc, alkaline and lithium and secondary (rechargeable) batteries e.g. nickel-cadmium, nickel metal hydride and lead-acid, may be used to power the energy-using device, in accordance with various embodiments discussed hereafter.

Referring now to FIG. 2, details of battery compartment 36, located at the lower back portion of device 12, are illustrated. The compartment may typically contain a housing for receiving a plurality of batteries 32a, 32b, 32c, shown connected in series, and connected, respectively, to a first electrically conductive terminal 38 formed at one end of the compartment, and a second electrically conductive terminal shown generally at 40 positioned remotely in another portion of the battery compartment 36. First terminal 38 may be a standard spring terminal, accommodating slight variations in the length of the battery. The entire compartment 36 may advantageously include a removable cover 42, locked into position with retaining ear 44 and spring clip 46, allowing ready access to battery compartment 36 for installation or replacement of the battery power sources.

Although not critical, typically electrically conductive spring terminal 38 will serve as the negative terminal of the battery compartment, making contact with the corresponding negative terminal of the battery, namely the outer case 48 thereof, whereas non-standard top terminal 50 of each of the batteries serves as the positive terminal of the battery, making contact with the second electrically conductive terminal 40 of the battery housing. Each of first and second electrically conductive terminals 38, 40 of the battery compartment are electrically connected to a load and appropriate battery recharging circuitry (not shown in FIG. 2), discussed more fully in respect to FIG. 4.

In accordance with the invention, as illustrated in FIG. 3 the second terminal 40 of the battery compartment includes first contact 52 which is preferably electrically conductive for use in the energy-using device of FIGS. 1 and 2, but which may also be formed of an insulative material to preclude electrical conduction. As shown, first contact 52 includes a distal contact 54 which is adapted to make contact with a standard positive terminal of a conventional battery (such contact being shown schematically in FIG. 6), while preferably not making contact with the associated battery terminal 50 of a battery 32a having a specially configured non-standard terminal configuration. In the preferred, illustrated embodiment terminal 50 is providing with a dimple, hole or recess 56 which receives, in non-contacting relationship, contact end 54 of terminal 40 of the battery compartment.

Battery compartment terminal 40 also includes a second contact 58, which is electrically conductive, and which is spaced from and insulated from contact 52, with interposed insulator members 51, 53. In the embodiment shown second contact 58 is formed of a pair of cylinder sections having respectively radially inwardly directed flanges 58a, 58b, between which an opening is defined for accommodating distal portion 54 of first contact 52. As shown in FIG. 3, second contact flange portions 58a, 58b make contact with raised contact seat 59 of battery terminal 50. Second contact 58 may be in other forms such as a one-piece cylinder. Battery terminal 50 in turn may be connected in the normal manner to battery top 60 (insulated from the battery can or container portion 48 which serves as a negative terminal). Terminal 50 is connected via conductor 62 to positive connecting strap 64 which in turn is integral with or connected to current collector tabs from the positive electrode plate(s). As is customary, the battery cell pack shown generally at 66 is composed of at least one negative electrode plate, at least one positive electrode plate, an interposed insulative and electrolyte retaining separator, and electrolyte absorbed within the pores of the separator and respective electrode plates.

While the device of the invention may be specially designed to be powered by non-standard size batteries or battery packs (e.g. of non-standard length or other dimension), an important advantage of the invention is that batteries of both standard and non-standard terminal configuration desirably also have dimensions e.g. length, which conform to industry standard, to permit direct interchangeability.

Battery compartment terminal 40 may be mounted in known fashion to an insulative structural wall member 8, forming part of the energy-using device, as well as being mounted at its opposite end to member 70 which can likewise be a structural member of the device, or alternatively a circuit board for mounting the electrical components of the charging circuitry utilized. In the embodiment of FIGS. 1-3, it is convenient to incorporate the charging circuitry internally within the housing of the energy-using device.

A schematic diagram of an electrical circuit residing in the housing of the energy-using device of FIGS. 1-3, for providing electrical current to a load 72 within the energy-using device, and for recharging the battery, is illustrated in FIG. 4. The circuit, shown generally at 11, as more fully described in U.S. Pat. No. 4,645,996, is adapted, in a first mode, to provide electrical energy from an external source 28 of electrical energy to the load 72 via first power circuit means in the form of an electrical circuit circumscribed by dashed outline 17. Power circuit 17 is comprised of a pair of electrical contacts 19 adapted to be connected to the external electrical energy source 28. Power circuit 17 is also comprised of transformer 21, full wave rectifier 23 and filter 25 arranged in a conventional manner to supply a substantially constant voltage across current conductor lines 27 and 29 and hence across load 72. In a first mode, that is when contacts 19 are in electrical contact with source of electrical energy 28, power circuit 17 delivers current to load 72 connected across current conductor lines 27 and 29. Electrical circuit 11 includes switch means 31 which connects load 72 across lines 27 and 29 when electrical contacts 19 are connected to the external source of energy 28. When source 28 is unplugged from contact 19, as when plug 30 in FIG. 1 is removed from the jack of the radio cassette tape player 10, circuit 11 is in a second (or battery powered) mode. In this second mode switch 31 (actuated by means not shown) is disconnected from line 27 and connected to conductor line 33. Thus load 72 is disconnected from power source 28 and may be battery powered in a manner hereafter more fully described. Also depicted in FIG. 4, is a second switch 35 (representative of one of the control buttons 24) of FIG. 1, which may be manually operated to turn the energy-using device on or off.

With circuit 17 connected to external source of electrical energy 28, the circuit 11 is adapted, in its first mode, to also supply electrical energy to rechargeable battery 32 via charging circuit means generally shown at 37. Charging circuit 37 should be designed appropriately for the application. For instance, a simple C/10 charging network (overnight charger) may consist of the illustrated series connected current limiting resistor 39 and unidirectional current flow means, in the form of diode 41. For the so-called "quick" (three hour rate) or "fast" (one hour rate) charging, suitable timer circuits or circuits with battery temperature feedback control and/or battery differential voltage control may be employed. The output from charging circuit 37 is connected through line 43 to second contact 58 of terminal 40 of the battery compartment to provide charging current to battery 32 through flange contacts 58a, 58b electrically contacting raised contact seat 59 (FIG. 3) of battery terminal 50.

When external power source 28 is disconnected from electrical contacts 19, switch 31 connects load 72 between current conducting lines 29 and 33 and hence in series with rechargeable battery 32. Electrical circuit 11 is then in the aforementioned second mode of operation. In this mode, battery 32 supplies power during its discharge to load 72, contained within energy-using device 10 of FIG. 1. More specifically, current discharge from rechargeable battery 32 flows through lines 43, 45 (which may be the same), thence through line 33, switch 31, closed switch 35, through load 72, and finally to the opposite terminal of the battery through line 47 and battery housing terminal 38.

Figure 5:
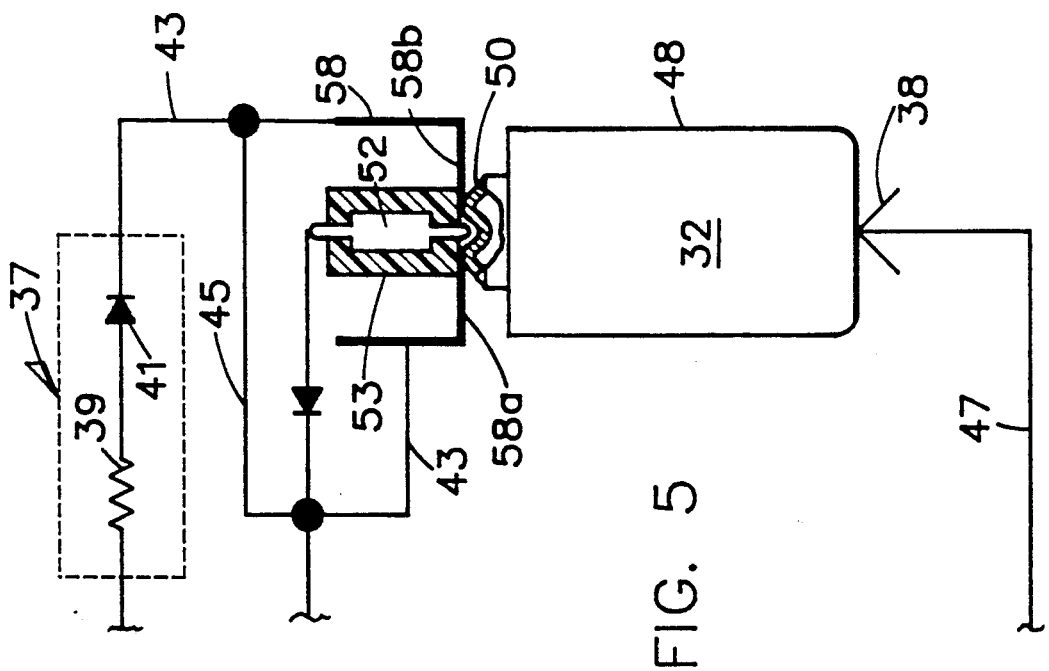

As better shown in FIG. 5, it will be noted that first contact 52 of terminal 40 will be received within the central recess of battery terminal 50, without making electrical contact therewith.

The embodiment of FIG. 6 illustrates the situation where a battery 32', which has a standard terminal configuration 50' provided with a substantially flat positive contact surface 72, is engaged in the battery housing and is in electrically conductive contact with spring terminal 38 and first contact 52 through distal contact end 54. As will be appreciated, in this embodiment battery 32' may operate in the second mode of operation of the electrical circuit 11 whereby current generated via discharge of battery 32' is made available to load 72. Current is conducted from contact 54 through unidirectional current carrying diode means 74, through switches 31 and 35, load 72 and returning through line 47. In the first mode of operation, however, charging current made available from charging circuitry 37 through line 43 cannot be impressed on battery 32' by virtue of the open circuit between second contact 58 and standard terminal configuration 50'. Battery 32' will receive no charging current thus protecting battery 32' if it is not designed to be recharged (i.e. a non-rechargeable battery), or if battery 32' is rechargeable but not designed to withstand the charging rate made available by circuitry 37. If battery 32' is a rechargeable battery of standard construction not compatible with the output of charger 37, battery 32' may be charged externally in a separate charger device, and then reinserted in the battery compartment 36 of the energy-using device, as required.

Batteries 32' and 32 preferably have the same or substantially the same overall length (within industry standard tolerance range).

Referring now to the embodiment of FIG. 7, there is shown an energy-using device, a rechargeable DC powered screwdriver, generally at 76. The housing is formed as handle 78 in which is contained a reversible drive motor load (not shown) operably powered by battery pack 80, consisting of two C-size rechargeable batteries. The motor rotatably drives screwdriver tip 82, controlled by switch 84. As with the radio cassette tape player of FIG. 1, battery pack 80 is contained within a battery compartment in the device housing, in this case in the handle of the screwdriver. The compartment is accessed by pivoting end cap 84 to the position shown in dashed lines. Batteries 80a and 80b are connected similarly as batteries 32a, 32b and 32c of FIG. 2. Terminal 50 of battery 80a interfaces with the corresponding second terminal 40' of the battery compartment of the screwdriver, which is formed on the underside of lid 84 and corresponds in material respects to terminal 40 shown in FIG. 3.

Unlike the embodiment of FIG. 1 in which the charging circuitry is contained in the housing of the energy-using device, the charger circuitry for screwdriver 76 may be contained in housing 86, screwdriver mounting holder 88, or both. The circuitry may be similar to that shown in FIG. 4 principally consisting of a transformer, rectifier, filter, and a suitable charging network such as a series current limiting resistor and diode. Preferably, however, more complex circuitry is utilized, of the type disclosed, for instance, in copending application Ser. No. 07/589,156, to allow dual rate charging, as shown in FIG. 8 and as will be described more fully hereafter.

The screwdriver may be stored (and charged) in typical U-shaped mounting holder 88 fastened to a wall with fastening screws or other members 90. Electrical contact between the battery pack and charging circuitry powered from a standard AC outlet is made through contacts 92a and 92b positioned to make contact with mating conductive contact members positioned on opposite sides of the upper handle portion of housing 78.

Referring now to FIG. 8, battery pack 80 (only one cell of which is shown) may desirably be connected to circuitry allowing for high-rate charging through charger circuitry 71 by utilizing a battery having non-standard terminal 50 and mating device terminal 40. In this instance high-rate charging current is supplied through line 73 and second contact conductor 58 to seat 59 of battery terminal 50. In the discharge mode battery 80 is connected to a load 72 through line 75, similar to the circuitry of FIG. 4. In a second mode of operation, a battery of standard terminal configuration, such as shown in FIG. 6, can be substituted for battery 80, whereby contact with its positive terminal 50' (not shown) permits recharge from low rate charging circuitry 77. Charging current is delivered through line 79, first contact member 52 (through its distal end 54), and then to the battery through contact terminal 50'. Since in this mode second contact member 58 will not be in electrical contact with terminal 50', only low-rate charging current will be supplied to the battery pack, as desired. In the discharge mode, the battery with a standard terminal configuration will discharge through first contact 52, which is insulated from second contact 58 by member 53, thence through unidirectional current carrying diode 81, line 75, switches 31 and 35, and then to load 72, returning through line 47 to first terminal 38 of the battery compartment of the energy-using device.

Thus, the battery operated screwdriver of FIG. 7 (which is DC powered only) can accept rechargeable cells, such nickel-cadmium or the like, of either high-rate charge and discharge capability, or low-rate charge and discharge capability, and of desired standard shape or size e.g. AA, sub-C, and D, without any modification to the first or second terminals 38, 40, respectively, of the battery compartment of the screwdriver.

Figure 9:
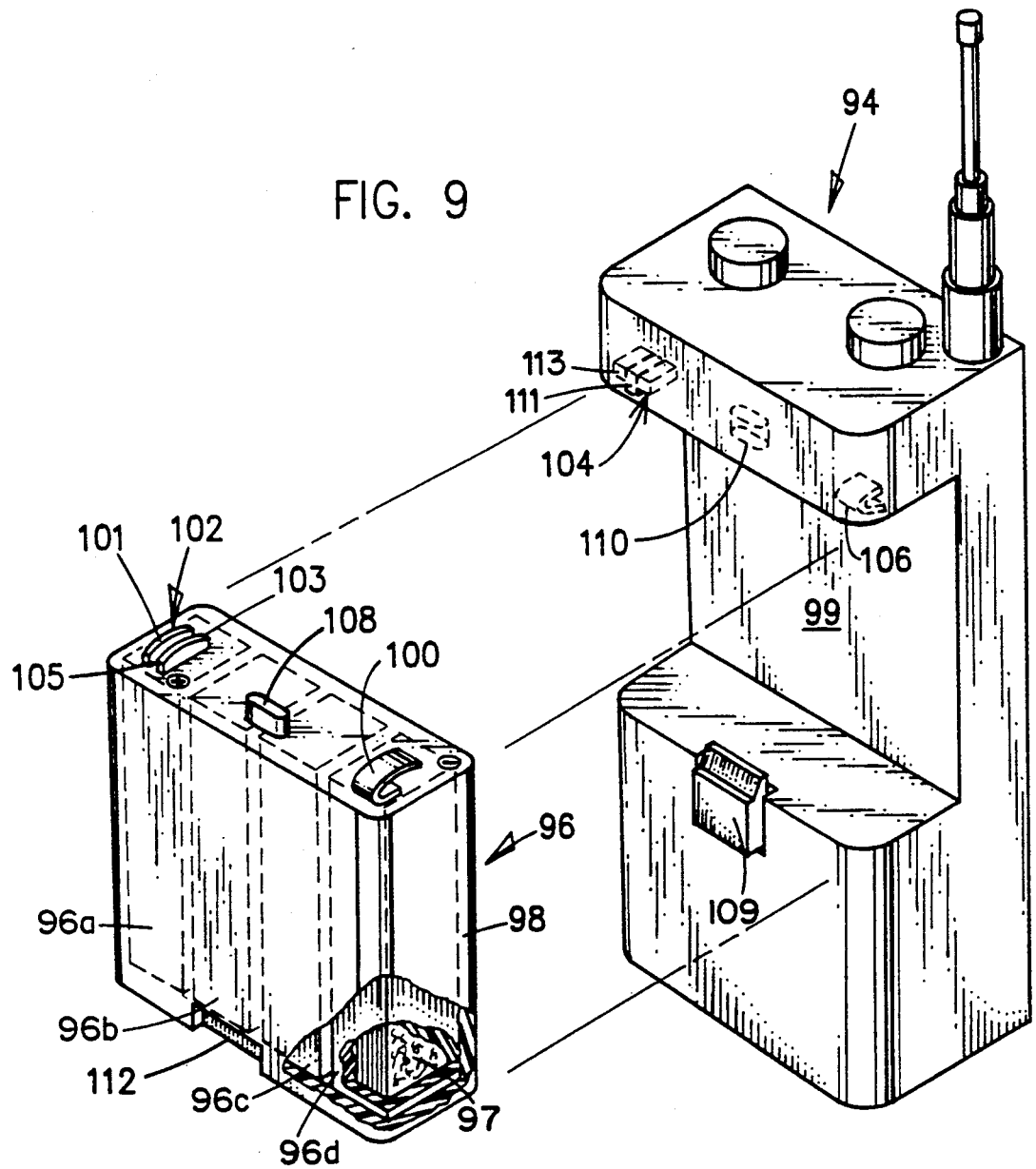
FIG. 9 illustrates a further energy-using device, in perspective, in which the battery is in the form of a snap-in pack.

In the alternative embodiment illustrated in FIG. 9, energy-using device 94, a transceiver, is powered by battery pack 96, which is formed of a molded plastic container 98 of parallelepiped shape, provided with negative output terminal 100 and positive output terminal 102 Battery 96 is itself composed of four series connected self-contained cells or batteries 96a, 96b, 96c, 96d, also of parallelepiped shape (sometimes referred to as "bubble gum" packs). The individual batteries will include a prismatic stack 97 of at least one positive plate, at least one negative plate, interposed separator, and absorbed electrolyte. The connections between the individual batteries 96a, b, c, d are not shown, nor the connections to output terminals 100, 102 through the outer battery case 98.

In accordance with the invention, output terminal 102 is provided with a non-standard terminal having juxtaposed interconnected raised portions 101, 103, with an interposed portion 105 which is recessed below the adjoining contact portions 101, 103. In lateral cross section terminal 102 may resemble in material aspects terminal 50 of FIG. 3, and will be adapted to mate with terminal 104 provided in the battery receiving compartment 99 of the transceiver. Terminal 104 will be provided with first and second insulated contacts 111, 113, similar to contacts 52 and 58 of terminal 40 of FIG. 3, making analogous connections to those shown in FIG. 5 (for the non-standard terminal battery) and FIG. 6 (for the standard terminal battery). Second battery contact 100 may be formed of standard spring metal making mating contact with a similar spring metal contact 106 formed in the battery receiving compartment of the energy-using device.

In this embodiment, the battery is positioned in an open compartment and may be installed by mating ear 108 within recess 110 of the transceiver while maintaining battery 96 at an angle with respect to the longitudinal axis of the transceiver. Thereafter, spring loaded catch 109 is depressed downwardly and the lower part of the battery rotated into compartment 99 until the battery is fully engaged within the compartment. Spring catch 109 is then allowed to return to its upper rest position, thus mating with corresponding detent 112 formed along the bottom edge of battery 96, and locking the battery securely in position in the transceiver.

Transceiver 94 may, as in the case of the device of FIG. 1, have a built-in electrical charging circuitry, or be associated with a separate charging stand, as desired.

Those skilled in the art will appreciate that various types and shapes of battery compartments for different energy-using devices may be designed to accommodate batteries having special terminals of non-standard configuration in accordance with the invention. As a further example, not illustrated, a cellular phone may have its battery slidably mounted on the backside of the telephone, in known manner. The molded outer battery case would be provided with terminals, and interfacing battery compartment terminals, configured in accordance with the operational principles of this invention.

The various embodiments of the invention which have been illustrated have employed as one of the battery terminals a non-standard terminal 50, 102 which employs a raised contact seat and in proximity thereto a recess or dimple. The mating terminal of the battery compartment 40, 104 has a corresponding contact portion 58, 113, for making contact with the raised contact seat 59, 101, 103 of the non-standard battery terminal, and a longitudinally protruding contact 54, 111 (which may be electrically conductive or an insulator, as the case may be) which is received within the recess or dimple 56, 105 of the non-standard terminal, preferably without making contact with terminal 50, 102 of the battery. It will be appreciated that various other non-standard battery terminal designs and corresponding battery compartment terminal configurations may be employed to define a different interface configuration provided the terminal of the battery compartment comprises at least first and second contacts spaced apart and insulated from one another, with the first contact of the battery compartment second terminal being arranged and adapted to make contact with a battery of standard terminal configuration, and that the second contact, which is electrically conductive, is arranged and adapted to make electrical contact with a battery of non-standard terminal configuration.

Accordingly, other non-standard battery terminal configurations may be employed, with corresponding two-contact battery terminals, to achieve the foregoing operation and function. As shown in FIG. 10, an alternative interface connection is shown in which a centrally located battery terminal 134 (which may be the positive terminal of the battery) has a raised charging contact seat 135 (offset from center) and an indentation 137 in lateral proximity thereto. The second terminal of the battery compartment includes the second conductive terminal contact portion 122 in the shape of a rod, provided with a distal contact end 125. The first contact 124 may also be rod-shaped, and has an end portion 142 in lateral proximity to second contact end 125. First contact end portion 142 extends outwardly past second contact end 125 a distance less than the depth of indentation 137. This depth is measured from contact seat 135 to the surface of the indentation shown at 137. As can be seen in FIG. 10, indentation 137 does not allow first contact end portion 142 to come into contact with battery terminal 134. As previously discussed first conductive terminal 124 may be replaced by a similarly-shaped insulator, depending upon the desired function. Furthermore, insulators 126, 129 have been provided to electrically insulate first and second contact terminal portions 124, 122 from each other, and to secure the two-contact terminal (or terminal-insulator) mechanism into place on suitable support sections 68' and/or 70' provided in the battery compartment of the energy-using device.

FIG. 10a illustrates a "head-on" view of second contact end 125, first contact end portion 142, and insulating spacers 126, 129.

FIG. 11, a view similar to that of FIG. 10a, illustrates another embodiment in which first contact end portion 142 is surrounded by insulated spacer 239. Alternative second contact end 225 of one of the terminals of the battery compartment is shown disposed radially around in a rectangular path and electrically insulated from first contact end portion 142 of the battery compartment terminal. Insulating spacer 226 mounts second conductive terminal 225 to vertical support section 68' (not shown in FIG. 11). The corresponding non-standard battery terminal may be in the form of a raised rectangular seat corresponding to the shape of contact member 225, to make mating connection therewith, or may be a series of bosses, positioned so as to make such contact.

While certain representative embodiments and details have been shown for the purpose of illustrating the invention, it will be apparent to those skilled in this art that various modifications may be made to the invention without departing from the spirit or scope of the invention.

What is claimed is:

1. An energy-using device energizable by a battery, the battery is selected from a group including a rechargeable battery with a standard terminal configuration, a non-rechargeable battery with a standard terminal configuration and a rechargeable battery with a non-standard terminal configuration, the device being operable in a battery charging mode in association with a power source and charging circuitry, with the battery mounted in the device, to recharge the rechargeable battery having the non-standard terminal configuration while not recharging the non-rechargeable battery and the rechargeable battery having the standard terminal configuration, comprising:

a housing and a load associated therewith;

a battery compartment in the housing for receiving the battery for powering the load;

a first electrically conductive terminal positioned in one portion of the compartment making contact with one terminal of the battery; and a second electrically conductive terminal positioned in a second portion of the compartment making contact with the other terminal of the battery, the second terminal comprised of a first conductive contact for making contact with the other terminal of one of the standard terminal configured batteries, and a second conductive contact spaced and insulated from said first conductive contact for making contact with the other terminal of the non-standard terminal configured battery.

2. The energy-suing device of claim 1 wherein the battery compartment is accessible to allow ready installation or replacement of the battery within the compartment.

3. The energy-using device of claim 1 wherein the first conductive contact of the second electrically conductive terminal of the battery compartment protrudes axially from, and is spaced laterally from the second conductive contact, the axis being the longitudinal axis of the battery.

4. The energy-using device of claim 3 in combination with the rechargeable battery having a non-standard terminal configuration, such non-standard terminal configuration, forming the said other terminal of the battery, formed of a raised contact seat making contact with the second contact of the second electrically conductive terminal of the battery compartment, and a recess or hole formed in lateral proximity to such raised contact seat for receiving the first conductive contact of the second electrically conductive terminal of the battery compartment, without making contact therebetween.

5. An energy-using device operably distinguishing between different types of battery power sources having standard and non-standard terminal configurations, the device having a housing, a load associated therewith, a compartment in the housing for receiving a battery for powering the load, the compartment having a first terminal for making electrical contact with one terminal of the battery and a second terminal for making electrical contact with the other terminal of the battery, characterized by:

the second terminal of the compartment comprises first and second contacts spaced apart and insulated from one another, at least one of such first and second contacts being electrically conductive, the first contact arranged for making contact with a battery of standard terminal configuration and the second contact being electrically conductive and arranged for making electrical contact with a battery of non-standard terminal configuration.

6. The energy-using device of claim 5 including, in operable association therewith, electrical circuitry for selectively recharging the rechargeable battery of non-standard terminal configuration inserted into the battery compartment, and not recharging the battery of standard terminal configuration inserted into the battery compartment.

7. The energy-using device of claim 5 including, in operable association therewith, electrical circuitry for selectively recharging at a first charging rate a rechargeable battery of non-standard terminal configuration inserted into the battery compartment, and for recharging at a second charging rate, different from the first charging rate, a battery of standard terminal configuration inserted into the battery compartment.

8. The energy-using device of claim 5 in combination with electrical charging circuitry built in to the housing, and wherein the battery compartment is accessible to allow ready installation or replacement of the battery within the compartment.

9. The energy-using device of claim 5 wherein the battery of non-standard terminal configuration has a length conforming to industry standard.

10. The energy-using device of claim 5 wherein the first contact of the second terminal is an insulator, thereby precluding charge or discharge, in the device, of the battery of standard terminal configuration.

11. The energy-suing device of claim 5 selectively operable in a mode selected from an AC mode and a DC mode, and wherein operation in the AC mode simultaneously results in the recharging of the battery mounted in the compartment only if such mounted battery has the non-standard terminal configuration.

12. The energy-using device of claim 5 wherein both of the first and second contacts of the second terminal are electrically conductive.

* * * * *